United States Patent [19]

Schwarz et al.

[11] 4,257,738
[45] Mar. 24, 1981

[54] ROTOR MOUNTING ASSEMBLY FOR ROTARY WING AIRCRAFT

[75] Inventors: Alois Schwarz, Putzbrunn; Karlheinz Mautz, Ottobrunn, both of Fed. Rep. of Germany

[73] Assignee: Messerschmitt-Bölkow-Blohm Gesellschaft mit beschränkter Haftung, Munich, Fed. Rep. of Germany

[21] Appl. No.: 886,653

[22] Filed: Mar. 15, 1978

[30] Foreign Application Priority Data

Mar. 23, 1977 [DE] Fed. Rep. of Germany ....... 2712706
May 17, 1977 [DE] Fed. Rep. of Germany ....... 2722250

[51] Int. Cl.$^3$ ............................................. B64C 11/06
[52] U.S. Cl. ................................. 416/134 A; 416/230; 416/244 R
[58] Field of Search .................... 416/134 A, 230, 141, 416/241 A, 244 R

[56] References Cited

U.S. PATENT DOCUMENTS

| 3,384,185 | 5/1968 | Fernandez | 416/134 A |
|---|---|---|---|
| 3,403,844 | 10/1968 | Stoffer | 416/230 |
| 3,470,962 | 1/1968 | Cure | 416/134 A |
| 3,761,199 | 9/1973 | Ferris et al. | 416/134 A |
| 3,762,834 | 10/1973 | Bourquardez et al. | 416/134 A |
| 3,797,964 | 3/1974 | Hanson | 416/134 A |
| 3,862,812 | 1/1975 | Gorndt et al. | 416/141 |
| 3,967,918 | 7/1976 | Mouille et al. | 416/134 A |
| 4,008,980 | 2/1977 | Noehren et al. | 416/141 |
| 4,012,169 | 3/1977 | Mouille et al. | 416/141 |
| 4,086,024 | 4/1978 | Weiland et al. | 416/241 A |
| 4,093,400 | 6/1978 | Rybicki | 416/141 |
| 4,156,583 | 5/1979 | Mayerjak | 416/244 R |
| 4,183,718 | 1/1980 | Mautz | 416/134 A |
| 4,195,967 | 4/1980 | Weiland | 416/134 A |

FOREIGN PATENT DOCUMENTS 1546935 12/1967 France ............................ 244/17.27

Primary Examiner—Everette A. Powell, Jr.
Assistant Examiner—A. N. Trausch, III
Attorney, Agent, or Firm—Toren, McGeady and Stanger

[57] ABSTRACT

The mounting assembly of a rotary wing aircraft is formed to include a central headpiece which operates to support the rotor blades of the aircraft, which blades are mounted to extend radially outwardly from the central headpiece. The headpiece includes rotor mounting supports having a bifurcated configuration consisting of two arms each having a flat, generally planar shape which extend at a right angle relative to the plane of the rotor. The headpiece may be formed of a pair of generally congruent plate members with an intermediate spacer member located therebetween, with the plate members and the spacer member being integrally joined together in a unitary structure made of composite fiber material.

15 Claims, 8 Drawing Figures

ROTOR MOUNTING ASSEMBLY FOR ROTARY WING AIRCRAFT

BACKGROUND OF THE INVENTION

The present invention relates generally to rotary wing aircraft and more particularly to a mounting assembly for the rotors of such aircraft. The invention is specifically directed toward the structure and configuration of a central headpiece for the rotor mounting assembly.

In a particular structural arrangement of a rotor mounting assembly known in the prior art, the rotor mounting supports or rotor support arms which have the rotor blade extending therefrom and which are formed at the rotor head, are structured as blade angle bearing sleeves. In the configuration referred to herein, which is known from German Pat. No. 2,150,741, the rotor blades are suspended at the rotor head by means of torsion-elastic tension laminae without flapping and laghinges. The rotor blades, which are equipped with metal fittings in the form of blade root sleeves, are each supported by two radial bearings which are constructed as roller bearings. The impact and bending moments which are created during operation of the device on each of the rotor blades are transmitted through radial bearings into the respective blade angle bearing sleeves or the central headpiece of the rotor.

Compared with constructions of the type which include flapping and laghinges, such a blade suspension system and support device provides significant weight reduction in the structure of the rotor head. However, a disadvantage arises in that comparatively high loads are created, particularly at the central headpiece which includes the blade support members. These loads generally result from shearing forces and bending moments. Therefore, high-strength metallic materials must be used for the purposes discussed. Such materials tend to be expensive and difficult to work with. Above all, they contribute significantly to an undesirably high structural weight of the overall rotor assembly.

The present invention is directed toward the objective of reducing structural weight and cost in a rotor assembly of the aforementioned type. Particularly, the invention is directed toward the overal configuration of the central headpiece of the rotor assembly which is designed to provide the aforementioned advantages without reducing dependability of operation and capacity for absorbing and withstanding rotor stresses.

SUMMARY OF THE INVENTION

Briefly, the present invention may be described as an improvement in the structure of a rotor head mounting assembly for rotary wing aircraft wherein the rotor blades of the craft are rotatably supported within a central headpiece. More specifically, the invention relates to the structure of the central headpiece which comprises an integrally formed body of composite fiber material which is shaped to define a plurality of rotor blade mounting supports each adapted to mount thereon a rotor blade, each of the supports having a bifurcated configuration composed of two arms which are of a flat, generally planar shape and which extend at a right angle relative to the plane of the rotor.

The central headpiece of the invention is composed of a pair of generally congruent plate members and with an intermediate space member located therebetween, the plate members and the spacer member being integrally joined together to form a unitary body of composite fiber material which constitutes the central headpiece of the rotor mounting assembly.

The invention is directed not only to the utilization of composite fiber materials in the formation of the central headpiece, which materials exhibit stiffness and strength behavior to impact characteristics wherein high stress resistance and lightweight construction may be effected, but the invention also, simultaneously, is concerned with the specific configuration of the central headpiece which renders this member suitable for utilization of the proposed materials. As a result of the configuration of the central headpiece, there may be achieved simple and inexpensive production of the device as well as utilization of the desired materials.

As will be noted, the central headpiece may basically be formed by a material union or integration of a pair of basically congruent plate members with a coaxial intermediate spacer member.

By a further aspect of the invention, in rotors which normally utilize an even number of rotor blades, with the blades being arranged in pairs and located diametrically opposite to one another, there may be provided the capacity for compensating for centrifugal forces emanating from the rotor blades. This may be accomplished by forming the central headpiece with a pair of bifurcated arms located diametrically opposite each other with each pair of arms operating as a blade mounting support and each essentially consisting of fiber strands which extend from the tip of some of the bifurcated arms to the tip of another arm, to wit, the strands being oriented in the directions of principal stresses. For transmitting centrifugal forces to the respective blade mounting supports, it will then be sufficient to provide a connection between the pair of bifurcated arms and the corresponding rotor blade or its blade root, this connection being capable of bearing compressive stresses in the longitudinal direction of the blades but operating to allow angular movements of the blade.

By a further aspect of the invention, a blade suspension system may be developed wherein the central headpiece is structured to permit rotor blades which are located diametrically opposite each other on the central headpiece to be interconnected at their blade roots. That is, a pair of such blades may be joined through the central headpiece to extend diametrically thereacross and to be interconnected therein.

Such an arrangement would normally not be obtainable with prior art structures particularly where torsion-elastic tension laminae were used. Such a headpiece could particularly not be available, in accordance with German Pat. No. 15 31 355, when rotor blades arranged in pairs located diametrically opposite each other are to be connected through tension laminae which extend in a single piece member from one blade to the other blade root, that is to be passed through the center of the rotor head. For a blade suspension of this type to be available, in accordance with this aspect of the invention, the central headpiece may be constructed from a pair of essentially congruent star-shaped plates in a coaxial arrangement including a distance piece or spacer arranged between the plates at the transition areas between the arms of the star-shaped plates. The distance pieces or spacers are arranged in such a manner that, on the one hand, between the blade mounting supports located diametrically opposite each other a free passage is maintained for interconnection at their roots of the corresponding pair of rotor blades. Also, on the other hand, each blade root may be radially supported at the root of the corresponding blade mounting support member.

Taking into consideration the criterion of maintaining a low structural weight for the device, a central headpiece of this type will also inevitably involve demands that the construction of the blade suspension be adjusted to the headpiece. In a preferred case where use is made of a four-blade rotor whose rotor blade pairs are located in a common plane of rotation, such demands may be met in a structurally simple manner in that the torsion-elastic portion of the connection at the root of one pair of rotor blades is passed at the center of the headpiece through the torsion-elastic portion of the connection at the root of the other pair of rotor blades without causing mutual interference in the rotary mobility of the two connections about their longitudinal axes. Thus, torsional stress of the torsion-elastic connection of each pair of rotor blades may be excluded during cyclic angular movements of the rotor blades.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
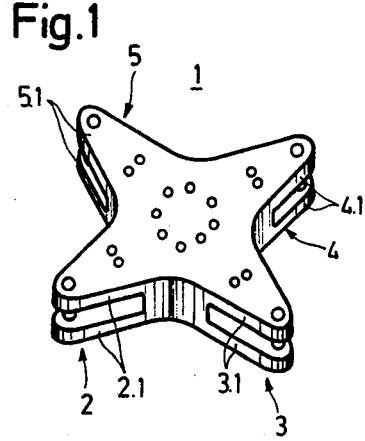
FIG. 1 is a perspective view of a central headpiece of a four-blade rotor of a rotary wing aircraft which embodies the invention.
Figure 2:
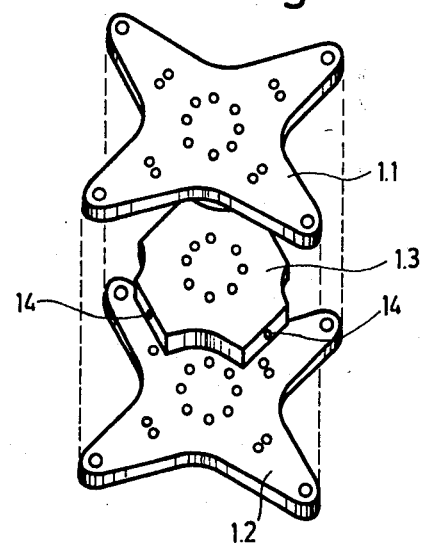
FIG. 2 shows the headpiece of FIG. 1 in an exploded representation.

With reference to FIGS. 1 and 2, there is shown therein a central headpiece 1 embodying the present invention which is intended for use in the rotor head assembly of a rotary wing aircraft having four rotor blades. The rotor blades of the aircraft may, for example, be made of fiber reinforced plastic. The headpiece 1 is configured to have thereon radially outwardly extending blade mounting supports which may be referred to as rotor support arms 2, 3, 4 and 5. Each of the rotor support arms 2–5 have a generally bifurcated configuration with each of the support arms 2–5 comprising, respectively, a pair of prongs or sides 2.1, 3.1, 4.1 and 5.1. Each of the prongs or sides of the bifurcated support arms 2–5 are of a generally flat, planar configuration and are arranged at right angles relative to the plane of the rotor.

The central headpiece 1 is formed as a unitary integral body made of a composite fiber material, for example, glass fibers and an artificial resin. The body of the central headpiece 1 is composed with fiber strands (not shown) which extend preferably diametrically across the headpiece 1 from one prong or side to a diametrically opposed prong or side. That is, the fiber strands may extend from the prong 2.1 to the prong 4.1 and from the prong 3.1 to the prong 5.1 continuously from the tip of one prong to the tip of the opposite prong. As a result, centrifugal forces originating in the respective pairs of rotor blades may be compensated through the headpiece. Due to the selected shape of the central headpiece 1, as shown in FIG. 2, the headpiece may be formed by joining together a pair of coincident or congruent plates 1.1 and 1.2 having a coaxial intermediate spacer piece 1.3 therebetween.

In the manufacture of the central headpiece 1, the three pieces which are integrally joined together in forming the headpiece 1 may, for example, be produced by a manual laminating method. The three pieces are joined together while still not yet fully hardened, that is, only in the prehardened state and they are jointly hardened under pressure. Accordingly, the central headpiece 1 may be produced by application of a method which is relatively simple in its accomplishment particularly with the form of configuration of the body of composite fiber material which is depicted in the drawing.

Other methods for producing the headpiece 1 may also be utilized such as, for example, the Roving stretching method or mechanical winding methods in which the headpiece may be produced, if necessary, in one operation.

Figure 3:
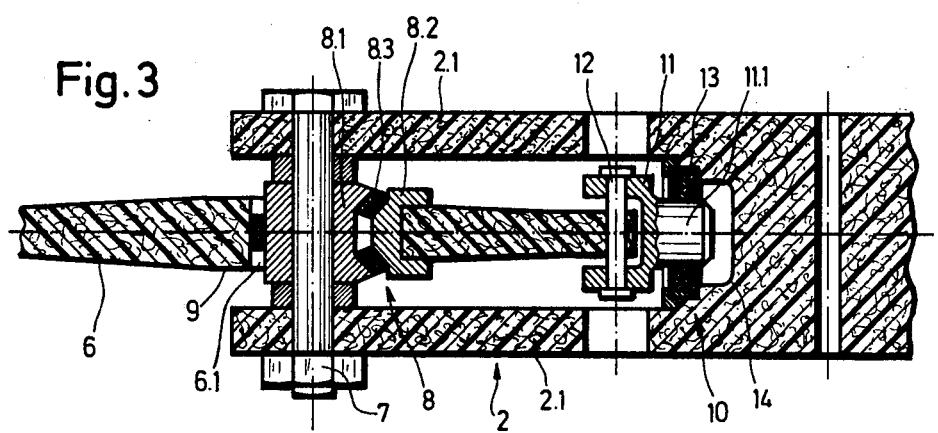
FIG. 3 is a vertical longitudinal section taken through a rotor arm of a headpiece constructed in accordance with FIGS. 1 and 2 in connection with a blade root.
Figure 3A:
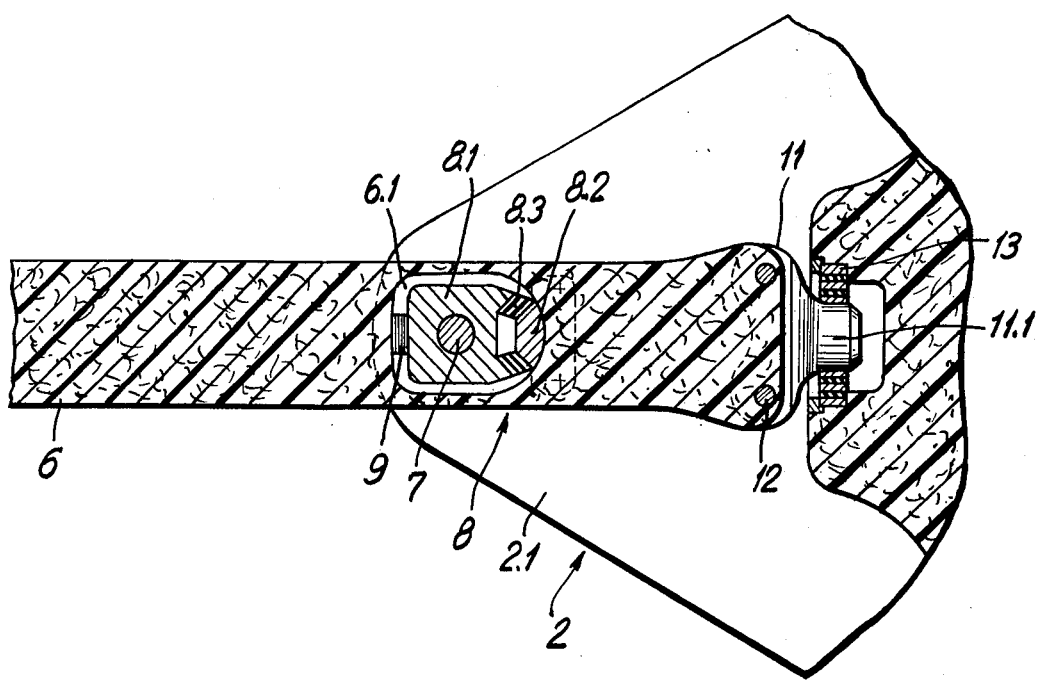
FIG. 3a is a horizontal sectional view showing additional details of the parts shown in FIG. 3.

FIG. 3 depicts a preferred embodiment for suspending or mounting the rotor blades at the central headpiece 1. In FIG. 3 there is shown a blade root 6 of a rotor blade and the rotor arm 2 assigned for engagement with the blade root 6. The sides or prongs 2.1 of the headpiece 1 support an elastomer bearing 8 through a pin 7. In the elastomer bearing 8, a conical laminated body 8.3 is inserted between a rigid tubular piece 8.1 fitted on the pin 7 and a rigid forked piece 8.2 acting on the blade root 6, the conical laminated body 8.3 consisting of alternating layers of rubber-elastic and rigid material. By means of another elastomeric laminated body 9 acting as a thrust bearing, a secure fit of the elastomer bearing 8 in the corresponding recess 6.1 of blade root 6 is accomplished.

A mounting assembly of the type depicted and disclosed is generally capable of absorbing compressive stresses in the longitudinal direction of the blades. By means of the connections indicated between blade root 6 and the rotor support arm 2, the centrifugal forces originating at the rotor blade are transmitted to the central headpiece 1. However, the rotor blade remains rotatable for adjusting the blade angle. The connections may also be accomplished by utilizing a spherical elastomer bearing. Simultaneously, the assembled connection disclosed offers the advantageous possibility of permitting rotor blades to be folded into a position about the pin 7 with the pin then severing as the axis of rotation. In order to utilize this capability, there is finally arranged a radial mounting assembly 10 which must be provided in any case through a trunnion 11.1 which may be loosened at the blade root, the radial mounting being arranged at the end of the blade root 6 which projects beyond the connection.

The trunnion 11.1 is part of a forked piece 11. This forked piece 11, on one side, is connected to the blade root 6 by means of pins 12 and, on the other side, it is supported in a bore 14 in the aformentioned intermediate spacer piece 1.3 (FIG. 2) of the central headpiece by means of trunnion 11.1 through a radial elastomer bearing 13. As shown in FIG. 3, it is merely necessary to pull the pins 12 in order to permit the blade root 6 to be freely rotated. The selected arrangement provides the additional advantage that the forked or bifurcated piece 11 may, at any time, operate as the connecting means for a blade adjusting lever. Finally, by means of the radial elastomer bearing 13, a damping of the rotation of the rotor blade is accomplished.

A central headpiece of the type described above and the concept of a blade suspension system adjusted to this piece is, of course, not restricted to a four-blade rotor aircraft. Indeed, the aircraft need not be restricted to an even number of rotor blades in order to have the disclosed structure applicable thereto.

Figure 4:
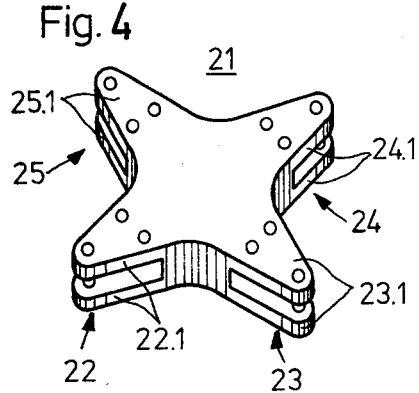
FIG. 4 is a perspective view of another central headpiece of a four-blade rotor.
Figure 5:
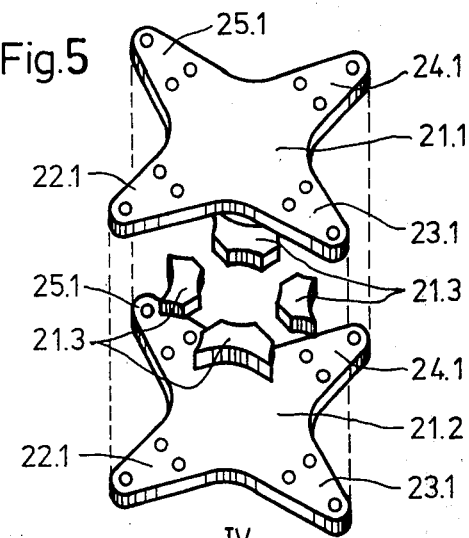
FIG. 5 shows the headpiece of FIG. 4 in an exploded representation.

A further embodiment of the invention is depicted in FIGS. 4 and 5. In this embodiment, a central headpiece 21 is provided which may be used in the rotor assembly of a rotary wing aircraft having four rotor blades and which is, for example, formed of fiber reinforced plastic. The central headpiece 21 consists of two coincident, congruent star-shaped plates 21.1 and 21.2, the plates being connected in a coaxial arrangement through distance or spacer pieces 21.3 arranged at the transitional areas between the prongs or sides 22.1 to 25.1. In accordance with this embodiment, the headpiece 21 is formed as a unitary integral body of composite fiber material wherein the plates 21.1 and 21.2 and the distance pieces 21.3 are, for example, united or joined in a manner wherein the materials thereof are interlocked by joint hardening of the materials under pressure. Thus, the members are integrally formed.

In contrast to the headpiece 1 described in connection with FIG. 1, the embodiment of FIGS. 4 and 5, as especially is shown in FIG. 5, is arranged with four distance pieces 21.3 configured to define free passages between the blade mounting support arms 22 and 24 of the composite body 21 and also between the blade mounting support arms 23 and 25, each of these pairs of support arms being located diametrically opposite each other on the headpiece 21 and each being formed in a bifurcated configuration with a pair of prongs or sides 22.1 or 24.1 and 23.1 or 25.1 respectively. The free passages provided are for the purpose of enabling interconnection of corresponding rotor blades to form a pair of rotor blades through connection at the roots. Simultaneously, there remains the possibility for radial support of corresponding blade roots 6 at the roots of corresponding blade mounting support arms.

Figure 6:
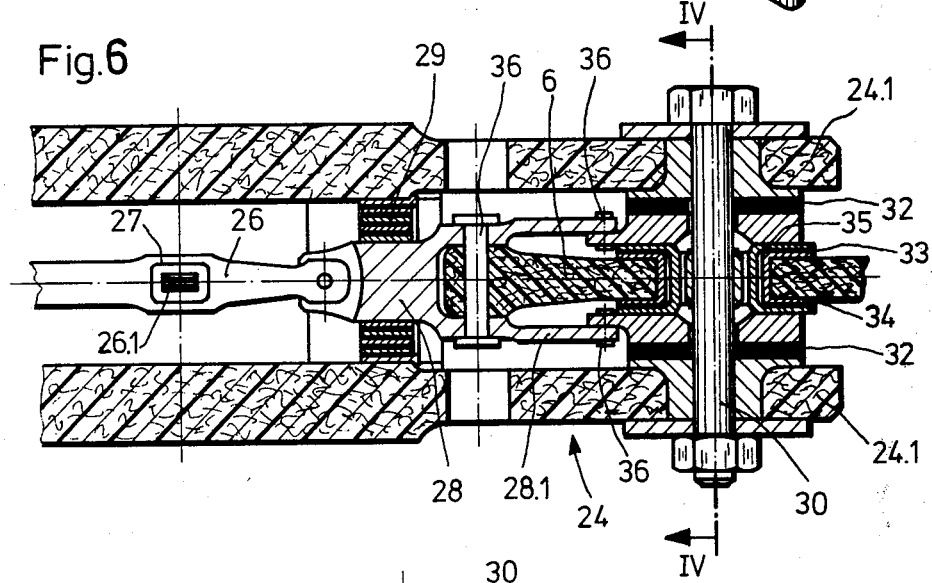
FIG. 6 is a vertical longitudinal section taken through a rotor arm and the center of the headpiece of a structure according to FIGS. 4 and 5 in connection with a blade suspension.

FIG. 6 depicts details of a preferred embodiment of a blade suspension system of the type discussed. In this embodiment, a connection is formed at the root of each pair of rotor blades the connection being made by a torsion-elastic rod 26 or 26.1 (for reasons of blade angle adjustment) which, for example, may consist of individual tension laminae combined in a package-like manner. In the center of the headpiece 21, one rod 26.1 is passed through another rod 26, with the rod 26 having an appropriate opening or break 27 therethrough. The arrangement is such that one rod is passed through the other rod without causing any interference with the rotatability of the rods about their longitudinal axes. This is achieved, in accordance with FIG. 6, by a crossed arrangement of the rods 26 26.1 wherein one rod 26.1 is arranged in a horizontal plane and the other rod 26 is arranged in a vertical plane. Moreover, as FIG. 6 shows, for each blade mounting support, i.e. the supports 22, 23, 24 and 25, the connection of each torsion-elastic rod 26 (or 26.1) with the blade root 6 is made through a rigid intermediate piece 28 which can be loosened at both sides. FIG. 6 depicts this arrangement for the blade mounting support arm 24.

Simultaneously, a radial mounting of the blade root in an elastomer bearing 29 at the root of the corresponding blade mounting support arm is made through the intermediate piece 28. The intermediate piece 28 may, at the same time, operate as the connecting means for a blade adjusted lever through a fork 28.1 of the intermediate piece 28.

Figure 7:
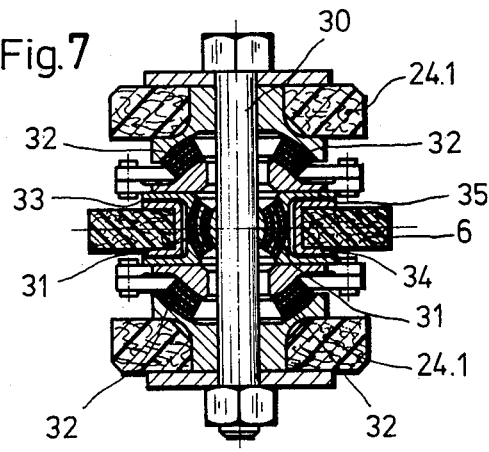
FIG. 7 is a sectional view taken along the line IV—IV of FIG. 6.

In the operation of the device, bending moments are generated on each rotor blade resulting from lead-lag and flapping of the rotor blades. Such bending moments must be absorbed by the blade mounting support arm 22-25 assigned to a particular blade. In accordance with the device depicted in FIGS. 6 and 7, the assembly of the invention is provided between the blade root 6 and a pin 30 with segment-shaped elastomeric bodies 31 or 32 for absorbing such bending moments. The elastomeric bodies 31 or 32 are positioned in a concentric arrangement relative to the longitudinal axis of the blade as depicted especially in FIG. 7. The pin 31 is fitted in the prongs or sides 24.1 of the blade mounting support arm 24. The axis of the pin 30 extends parallel to the axis of rotation of the rotor. On the one hand, with reference to the impact action of the device, the elastomeric bodies 31 are arranged in the plane of the blades. On the other hand, where reference is had to the flapping action, the bodies 32 are arranged on both sides of the plane of the blades. Such a connection between the blade root 6 and each assigned blade mounting support arm 22-25, has the advantage that the bending moments resulting from impact and flapping action are transmitted separately onto the rotor head or its central headpiece 21. Of course, such connections are also capable of bearing compressive stresses in the longitudinal direction of the blade while allowing blade angle movements. Additionally, by means of another elastomeric layer 33 arranged between a metal fitting 34 embedded in the blade root 6 and a rigid outer ring 35 of the elastomeric bodies 31 arranged in the plane of the blade, the outer ring 35 engaging over the metal fitting 34, there may be introduced in a simple manner an additional impact damping for the rotor blade.

Of course, the blade suspension and mounting system described above offers, as does the system according to FIG. 3, the possibility that the blade may be rotated into a folded position about the pin 30 which then serves as the axis of rotation. Toward this end, it is only necessary to pull the connecting means 36 which are inserted in the fork 28.1 of the intermediate piece 28.

While specific embodiments of the invention have been shown and described in detail to illustrate the application of the inventive principles, it will be understood that the invention may be embodied otherwise without departing from such principles.

What is claimed is:

1. A central headpiece for a rotor head mounting assembly of rotor wing aircraft having a drive shaft and a rotor including rotor blades for mounting said rotor for rotation on said drive shaft comprising an integral body of composite fiber material adapted to have said rotor blades mounted thereon, said central headpiece being shaped to define a plurality of rotor blade mounting support arms each adapted to mount a rotor blade, each of said mounting support arms having a bifurcated configuration composed of a pair of sides which are of a generally flat planar configuration and each of which extends in a plane perpendicular to the drive shaft of an aircraft upon which said headpiece is adapted to be mounted, said integral body of said headpiece being essentially composed of a pair of generally congruent planar plate members lying in essentially parallel planes with intermediate spacer means located therebetween, said plate members and said spacer means being integrally joined together to form said central headpiece as a unitary body of composte fiber material, said mounting support arms being adapted to receive therebetween connection means for pivotally supporting each of said rotor blades between each of said pair of sides of said mounting support arms.

2. In a rotor head mounting assembly for the rotor of a rotary wing aircraft having rotor blades which are pivotally supported at the rotor head by blade angle bearings and which are mounted for rotation about a drive shaft, said assembly being formed to include a central headpiece having said rotor blades mounted thereon, the improvement wherein said central headpiece comprises an integral body of composite fiber material, said body being shaped to define a plurality of rotor blade mounting support arms each adapted to mount a rotor blade, each of said mounting support arms having a bifurcated configuration composed of a pair of sides which are of a generally flat planar configuration and each of which extends in a plane perpendicular to said drive shaft, said central headpiece being essentially composed of a pair of generally congruent plate members with intermediate spacer means located therebetween, said plate members and said spacer means being integrally joined together to form said central headpiece as a unitary body of composite fiber material, each of said mounting support arms being equipped with connection means for mounting between the sides of each of said bifurcated support arms a rotor blade, said connection means being formed to enable bearing of compressive stresses in the longitudinal direction of a rotor blade while allowing angular movement of said blade, said connection means including bearing means and trunnion means located radially inwardly of said bearing means and rotatably supporting said rotor blade within said mounting assembly, said rotor blade extending radially inwardly of said mounting assembly beyond said bearing means and being rotatably supported at said central headpiece by means of said trunnion means, said trunnion means being adapted to be releasable at the inwardly extending end of said blade.

3. In a rotor head mounting assembly for the rotor of a rotary wing aircraft having rotor blades which are pivotally supported at the rotor head by blade angle bearings and which are mounted for rotation about a drive shaft, said assembly being formed to include a central headpiece having said rotor blades mounted thereon, the improvement wherein said central headpiece comprises an integral body of composite fiber material, said body being shaped to define a plurality of rotor blade mounting support arms each adapted to mount a rotor blade, each of said mounting support arms having a bifurcated configuration composed of a pair of sides which are of a generally flat planar configuration and each of which extends in a plane perpendicular to said drive shaft, said central headpiece being essentially composed of a pair of generally congruent plate members with intermediate spacer means located therebetween, said plate members and said spacer means being integrally joined together to form said central headpiece as a unitary body of composite fiber material, each of said mounting support arms being equipped with connection means for mounting between the sides of each of said bifurcated support arms a rotor blade, said connection means being formed to enable bearing of compressive stresses in the longitudinal direction of a rotor blade while allowing angular movement of said blade, said connection means including a trunnion locate between the sides of each of said support arms, an elastomer bearing and a forked piece operatively associated with said trunnion.

4. In a rotary wing aircraft having a drive shaft and a rotor including rotor blades, a rotor head mounting assembly for mounting said rotor for rotation on said drive shaft comprising: a central headpiece formed as an integral body of composite fiber material having said rotor blades mounted thereon, said central headpiece being shaped to define a plurality of rotor blade mounting support arms each adapted to mount a rotor blade, each of said mounting support arms having a bifurcated configuration composed of a pair of sides which are of a generally flat planar configuration and each of which extends in a plane perpendicular to said drive shaft, said integral body of said central headpiece being essentially composed of a pair of generally congruent plate members with intermediate spacer means located therebetween, said plate members and said spacer means being integrally joined together to form said central headpiece as a unitary body of composite fiber material, and connection means for pivotally supporting each of said rotor blades between each of said pair of sides of said mounting support arms.

5. A rotor assembly according to claim 4 particularly for an aircraft having an even number of rotor blades, said blades being located in pairs diametrically opposite each other, said assembly being characterized in that for each pair of blade mounting support arms, the respective planar sides of each bifurcated arm located diametrically opposite each other are formed to consist essentially of fiber strands which extend from the tip of one support arm diametrically across the central headpiece to the tip of the opposite support arm.

6. A rotor assembly according to claim 4 wherein said intermediate spacer means comprises a single distance piece.

7. A rotor assembly according to claim 4 particularly for a rotary wing aircraft having an even number of rotor blades located in pairs arranged with the blades thereof diametrically opposite each other wherein for each of said pair of rotor blades a tension-proof torsion-elastic connection between rotor blades is provided in the central headpiece of said assembly, said central headpiece being constructed as an integral unitary body with said pair of plate members being formed as essentially star-shaped congruent plates, said intermediate spacer means comprising a plurality of distance pieces arranged between said plates at transition areas between the star arms of said plates, said distance pieces being arranged in such a manner that an open passage is provided through said central headpiece for each pair of diametrically opposed rotor blades in order to enable connection of said blades at blade roots located radially centrally of said rotor assembly, each blade root being radially supported at the root of a corresponding blade mounting support arm.

8. A rotor assembly according to claim 7 wherein the number of said rotor blades is four and wherein said rotor blades are arranged in two pairs of blades arranged in a common plane of rotation, said blades including blade roots mounted within said central headpiece, said assembly being characterized in that in the center of said headpiece a torsion-elastic part which forms the connection between one pair of rotor blades is passed through a torsion-elastic part forming the connection between the roots of the other of said pair of rotor blades, said torsion-elastic parts passing through each other in a manner avoiding interference with the rotatability of said two connections about their longitudinal axes.

9. A rotor assembly according to claim 8 wherein one of said torsion-elastic parts is arranged in a horizontal plane and wherein the other of said torsion-elastic parts is arranged in a vertical plane.

10. A rotor assembly according to claim 8 further comprising a rigid intermediate member located between each blade root and its corresponding torsion-elastic portion, said rigid intermediate member being provided for each respective connection between the roots of a pair of diametrically opposite blades, said rigid intermediate member being adapted to be loosened at both sides thereof and capable of rotatably supporting therethrough each said blade root at the root of said blade mounting support arms.

11. A rotor assembly according to claim 7 wherein said connection means comprise a pair of elastomer bearings provided for each blade mounting support arm between each of the sides of said arm and the corresponding blade root mounted therebetween, said elastomer bearings providing a connection capable of bearing compressive stresses in the longitudinal direction of the blades but permitting angular movements of the blades, said connection being made in such a manner that bending moments resulting from (lead-lag) and flapping action acting on said rotor blades are separately transmitted through one elastomer bearing each to said blade mounting support arm.

12. A rotor assembly according to claim 11 wherein said connection means further comprise segment-shaped elastomeric bodies provided between each blade root and a pin, said pin being fitted in the sides of said blade mounting support arms with said pin having an axis parallel to the axis of rotation of said rotor, said elastomeric bodies being arranged with regard to (lead-lag) effects in the plane of said blades and with regard to flapping effects on both sides of the plane of said blade.

13. A rotor assembly according to claim 4 wherein said connection means include bearing means operatively associated with each of said mounting support arms for mounting between the sides of each of said bifurcated support arms a rotor blade, said bearing means being formed to enable bearing of compressive stresses in the longitudinal direction of a rotor blade while allowing angular movement of said blade.

14. A rotor assembly according to claim 13 wherein said connection means further include trunnion means located radially inwardly of said bearing means and rotatably supporting said rotor blade within said mounting assembly, said rotor blade extending radially inwardly of said mounting assembly beyond said bearing means and being rotatable supported at said central headpiece by means of said trunnion means, said trunnion means being adapted to be releasable at the inwardly extending end of said blade.

15. A rotor assembly according to claim 13 wherein said trunnion means comprise a trunnion located between the sides of each of said support arms, an elastomer bearing and a forked piece operatively associated with said trunnion.

* * * * *